[12] United States Patent  
Ng et al.

(10) Patent No.: US 10,410,202 B1  
(45) Date of Patent: Sep. 10, 2019

(54) EXPEDITED BOOTING WITH BROWNOUT MONITORING

(71) Applicant: Square, Inc., San Francisco, CA (US)

(72) Inventors: Kevin Ka Wai Ng, Markham (CA); Malcolm Smith, Toronto (CA); Afshin Rezayee, Richmond Hill (CA); Yue Yang, Thornhill (CA); Jeremy Wade, San Francisco, CA (US)

(73) Assignee: Square, Inc., San Francisco, CA (US)

(*) Notice: Subject to any disclaimer, the term of this patent is extended or adjusted under 35 U.S.C. 154(b) by 359 days.

(21) Appl. No.: 15/396,611

(22) Filed: Dec. 31, 2016

(51) Int. Cl.
| | |
|---|---|
| *G06F 15/177* | (2006.01) |
| *G06Q 20/32* | (2012.01) |
| *G06Q 20/34* | (2012.01) |
| *G06F 9/4401* | (2018.01) |
| *G06F 1/08* | (2006.01) |

(52) U.S. Cl.
CPC ........... *G06Q 20/3223* (2013.01); *G06F 1/08* (2013.01); *G06F 9/4405* (2013.01); *G06Q 20/3278* (2013.01); *G06Q 20/341* (2013.01); *G06F 9/4401* (2013.01)

(58) Field of Classification Search
CPC ..... G06F 1/08; G06F 9/4405; G06Q 20/3278; G06Q 20/341
USPC .......................................................... 713/2
See application file for complete search history.

(56) References Cited

U.S. PATENT DOCUMENTS

| | | | |
|---|---|---|---|
| 5,559,889 A | 9/1996 | Easter et al. | |
| 6,874,083 B2* | 3/2005 | Sarangi | G06F 1/24 713/1 |
| 6,895,517 B2* | 5/2005 | Wang | G06F 1/3203 713/300 |

(Continued)

FOREIGN PATENT DOCUMENTS

| | | |
|---|---|---|
| AU | 2014256377 A1 | 5/2015 |
| AU | 2017201800 A1 | 4/2017 |

(Continued)

OTHER PUBLICATIONS

National Institute of Standards and Technology, "Federal Information Processing Standard (FIPS) 140-1: Security Requirements for Cryptographic Modules," Jan. 11, 1994, pp. 1-55.

(Continued)

*Primary Examiner* — Volvick Derose  
(74) *Attorney, Agent, or Firm* — Maynard Cooper & Gale, P.C.; Brian T. Sattizahn, Esq.

(57) ABSTRACT

An expedited booting process with brownout detection for a payment reader is provided. The payment reader can execute a boot sequence from read only memory at startup. A check is made of a stored flag value to determine whether a value such as a flag indicates whether or not a prior execution of the boot sequence was successful. If the last execution of the boot sequence was successful, the boot sequence can be executed at a faster clock rate. Otherwise the boot sequence is executed at a slower clock rate. An evaluation can be made to determine whether a predetermined portion of the boot sequence has been surpassed. If the predetermined portion of (Continued)

the boot sequence has been surpassed, the flag value can be set to indicate a successful execution of the boot sequence and the general operating instructions for the payment reader are then executed.

25 Claims, 5 Drawing Sheets

(56) References Cited

U.S. PATENT DOCUMENTS

| | | | |
|---|---|---|---|
| 7,581,128 B2* | 8/2009 | Yamada | G06F 1/30 |
| | | | 327/141 |
| 7,837,110 B1 | 11/2010 | Hess et al. | |
| 7,861,097 B2 | 12/2010 | Smeets et al. | |
| 8,613,387 B1 | 12/2013 | Billett et al. | |
| 8,990,121 B1 | 3/2015 | Guise et al. | |
| 9,135,472 B2 | 9/2015 | Smith et al. | |
| 9,390,412 B2 | 7/2016 | Weber et al. | |
| 9,426,127 B2 | 8/2016 | Huxham et al. | |
| 9,542,678 B1 | 1/2017 | Glashan et al. | |
| 9,665,870 B1 | 5/2017 | Rezayee et al. | |
| 9,818,004 B1 | 11/2017 | Rezayee et al. | |
| 9,870,558 B1 | 1/2018 | Rezayee et al. | |
| 9,886,596 B1 | 2/2018 | Smith et al. | |
| 10,055,234 B1* | 8/2018 | Rao | G06F 9/441 |
| 10,068,223 B1 | 9/2018 | Rezayee et al. | |
| 10,235,667 B2 | 3/2019 | Rezayee et al. | |
| 2002/0002429 A1* | 1/2002 | Sugimura | F01P 11/16 |
| | | | 701/33.6 |
| 2004/0158784 A1 | 8/2004 | Abuhamdeh et al. | |
| 2004/0255199 A1 | 12/2004 | Yamashita | |
| 2005/0022042 A1* | 1/2005 | Tam | G06F 1/04 |
| | | | 713/323 |
| 2005/0223211 A1* | 10/2005 | Sukegawa | G06F 9/4403 |
| | | | 713/2 |
| 2007/0001720 A1* | 1/2007 | Li | G06F 1/28 |
| | | | 327/143 |
| 2007/0226806 A1 | 9/2007 | Tung et al. | |
| 2008/0130893 A1 | 6/2008 | Ibrahim et al. | |
| 2008/0183912 A1 | 7/2008 | Monroe et al. | |
| 2008/0271001 A1 | 10/2008 | Nonomura et al. | |
| 2009/0109718 A1* | 4/2009 | Wu | H02M 3/157 |
| | | | 363/147 |
| 2009/0138748 A1* | 5/2009 | Kim | G06F 1/08 |
| | | | 713/503 |
| 2009/0282261 A1 | 11/2009 | Khan et al. | |
| 2009/0327569 A1* | 12/2009 | Titone | C07D 401/12 |
| | | | 710/309 |
| 2009/0327795 A1* | 12/2009 | Priel | G06F 1/14 |
| | | | 713/600 |
| 2010/0070749 A1* | 3/2010 | Tsai | G06F 9/441 |
| | | | 713/2 |
| 2010/0070791 A1* | 3/2010 | Priel | G06F 21/554 |
| | | | 713/340 |
| 2010/0077232 A1* | 3/2010 | Jahagirdar | G06F 1/3203 |
| | | | 713/300 |
| 2010/0125554 A1* | 5/2010 | Jennings | G06F 9/4418 |
| | | | 707/674 |
| 2010/0211507 A1 | 8/2010 | Aabye et al. | |
| 2010/0235618 A1* | 9/2010 | Erforth | G06F 9/4403 |
| | | | 713/2 |
| 2011/0222322 A1* | 9/2011 | Kris | H02M 1/36 |
| | | | 363/49 |
| 2011/0271070 A1 | 11/2011 | Worthington et al. | |
| 2011/0289294 A1 | 11/2011 | Maeda et al. | |
| 2013/0070514 A1 | 3/2013 | Weiss et al. | |
| 2013/0086375 A1 | 4/2013 | Lyne et al. | |
| 2014/0019741 A1* | 1/2014 | Nautiyal | G06F 9/4408 |
| | | | 713/2 |
| 2014/0074637 A1 | 3/2014 | Hammad | |
| 2014/0077781 A1* | 3/2014 | Murakami | H02M 3/04 |
| | | | 323/282 |
| 2014/0108786 A1 | 4/2014 | Kreft | |
| 2014/0114495 A1* | 4/2014 | Larsson | H02J 3/1828 |
| | | | 700/297 |
| 2015/0046335 A1 | 2/2015 | Huxham et al. | |
| 2015/0052064 A1 | 2/2015 | Karpenko et al. | |
| 2015/0208356 A1* | 7/2015 | Niu | H04W 52/0261 |
| | | | 455/574 |
| 2015/0227932 A1 | 8/2015 | Huxham et al. | |
| 2015/0356299 A1* | 12/2015 | Barkelew | G06F 21/575 |
| | | | 713/2 |
| 2016/0104154 A1 | 4/2016 | Milov et al. | |
| 2016/0179163 A1* | 6/2016 | Haider | G06F 1/3243 |
| | | | 713/320 |
| 2016/0370837 A1* | 12/2016 | Shi | G06F 1/324 |
| 2017/0068960 A1* | 3/2017 | Kwak | G06Q 20/4012 |
| 2017/0091762 A1 | 3/2017 | Rezayee et al. | |
| 2017/0184642 A1* | 6/2017 | Menard | G05B 19/0428 |
| 2017/0236125 A1 | 8/2017 | Guise et al. | |
| 2017/0371679 A1* | 12/2017 | Chandrasekhar | G06F 3/067 |
| 2018/0247084 A1 | 8/2018 | Smith et al. | |

FOREIGN PATENT DOCUMENTS

| | | |
|---|---|---|
| CA | 2 868 644 A1 | 4/2015 |
| MX | 2014013295 A | 11/2015 |
| WO | 2008/156328 A2 | 12/2008 |

OTHER PUBLICATIONS

National Institute of Standards and Technology, "Federal Information Processing Standards Publication 140-2: Security Requirements for Cryptographic Modules," May 25, 2001, pp. 1-69.

National Institute of Standards and Technology, "Annex A: Approved Security Functions for FIPS PUB 140-2, Security Requirements for Cryptographic Modules," May 30, 2012, pp. 1-9.

National Institute of Standards and Technology, "Annex B: Approved Protection Profiles for FIPS PUB 140-2, Security Requirements for Cryptographic Modules," Aug. 12, 2011, pp. 1-6.

Non-Final Office Action dated Feb. 4, 2015, for U.S. Appl. No. 14/068,484, of Smith, M.R., et al., filed Oct. 31, 2013.

Notice of Allowance dated Jun. 4, 2015, for U.S. Appl. No. 14/068,484, of Smith, M.R., et al., filed Oct. 31, 2013.

First Examination Report for New Zealand Patent Application No. 701459, dated Nov. 20, 2015.

Further Examination Report for New Zealand Patent Application No. 701459, dated Apr. 29, 2016.

Further Examination Report for New Zealand Patent Application No. 701459, dated Jul. 13, 2016.

English-language translation of Office Action for Mexican Patent Application No. 2014013295, dated Aug. 4, 2016.

Notice of Acceptance for New Zealand Patent Application No. 701459, dated Nov. 21, 2016.

Notice of Acceptance for Australian Patent Application No. 2014256377, dated Dec. 12, 2016.

Non-Final Office Action dated Jun. 21, 2017, for U.S. Appl. No. 14/749,992, of Smith, M.R., et al., filed Jun. 25, 2015.

Examiner Requisition for Canadian Patent Application No. 2,868,644, dated Jun. 28, 2017.

Notice of Allowance dated Jul. 17, 2017, for U.S. Appl. No. 15/253,813, of Rezayee, A., et al., filed Aug. 31, 2016.

Notice of Allowance dated Aug. 25, 2017, for U.S. Appl. No. 15/631,785, of Rezayee, A., et al., filed Jun. 23, 2017.

Notice of Allowance dated Sep. 14, 2017, for U.S. Appl. No. 15/631,785, of Rezayee, A., et al., filed Jun. 23, 2017.

Notice of Allowance dated Sep. 22, 2017, for U.S. Appl. No. 14/749,992, of Smith, M.R., et al., filed Jun. 25, 2015.

Non-Final Office Action dated Feb. 8, 2018, for U.S. Appl. No. 15/846,196, of Rezayee, A., et al., filed Dec. 18, 2017.

First Examination Report for Australian Patent Application No. 2017201800, dated Mar. 21, 2018.

Notice of Allowance dated May 2, 2018, for U.S. Appl. No. 15/846,196, of Rezayee, A., et al., filed Dec. 18, 2017.

Notice of Acceptance for Australian Patent Application No. 2017201800, dated Jul. 4, 2018.

(56) References Cited

OTHER PUBLICATIONS

International Search Report and Written Opinion for International Application No. PCT/US2018/039060, dated Sep. 3, 2018.
Non-Final Office Action dated Sep. 10, 2018, for U.S. Appl. No. 15/859,036, of Smith, M.R., et al., filed Dec. 29, 2017.
Examiner Requisition for Canadian Patent Application No. 2,868,644, dated Sep. 13, 2018.
Non-Final Office Action dated Oct. 22, 2018, for U.S. Appl. No. 15/721,872, of Rezayee, A., et al., filed Sep. 30, 2017.
Notice of Allowance dated Oct. 29, 2018, for U.S. Appl. No. 16/120,398, of Rezayee, A., et al., filed Sep. 3, 2018.
Notice of Allowance dated Dec. 3, 2018, for U.S. Appl. No. 16/120,398, of Rezayee, A., et al., filed Sep. 3, 2018.
Non-Final Office Action dated Jan. 7, 2019, for U.S. Appl. No. 15/859,036, of Smith, M.R., et al., filed Dec. 29, 2017.
Notice of Allowance dated Feb. 7, 2019, for U.S. Appl. No. 15/721,872, of Rezayee, A., et al., filed Sep. 30, 2017.
International Search Report and Written Opinion for International Application No. PCT/US2018/053494, dated Jan. 29, 2019.

* cited by examiner

EXPEDITED BOOTING WITH BROWNOUT MONITORING

BACKGROUND

Electronic transaction processing systems may utilize a payment terminal. The payment terminal can include a payment reader with corresponding circuits that are used to process payment transactions and interact with payment devices such as a payment card having a magnetic strip that is swiped in a magnetic reader of the payment reader, a payment device having a Europay/Mastercard/Visa (EMV) chip that is inserted into a corresponding EMV slot of the payment reader, and near field communication (NFC) enabled devices such as a smartphone or EMV card that is tapped at the payment reader and transmits payment information over a secure wireless connection.

In a situation where the payment reader has a limited power supply, such as when a battery is used, the continuous powering of the payment reader during times of inactivity can shorten the operational life of the payment reader, i.e., the time the payment reader can be used before recharging of the battery is required. This shortens the amount of time that the payment reader can process payment transactions before requiring additional charging, which may itself take a significant amount of time. To extend the operational life of the payment reader, the payment reader may transition into an "off" mode, for example, due to a user input (e.g., a button press) or after the expiration of a period of inactivity. In some instances, the payment reader may require the execution of a boot process from the off mode before it begins operation to process payment transactions.

The initiation of the boot process to transition from the "off" mode can occur when the payment reader is needed to process a payment transaction. It may be desired for the payment reader to complete the boot process as quickly as possible in order for the processing of payment transactions to begin. When the power supply has a low power level a brownout condition may occur, particularly during times of high current draw such as during the boot process. In some conditions this may occur even if an external power source (e.g., an AC or DC power source) is attached to the payment reader, for example, while the battery is charging. In some instances the boot process may not be able to complete, such that payment transactions may not be processed for an extended period of time.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
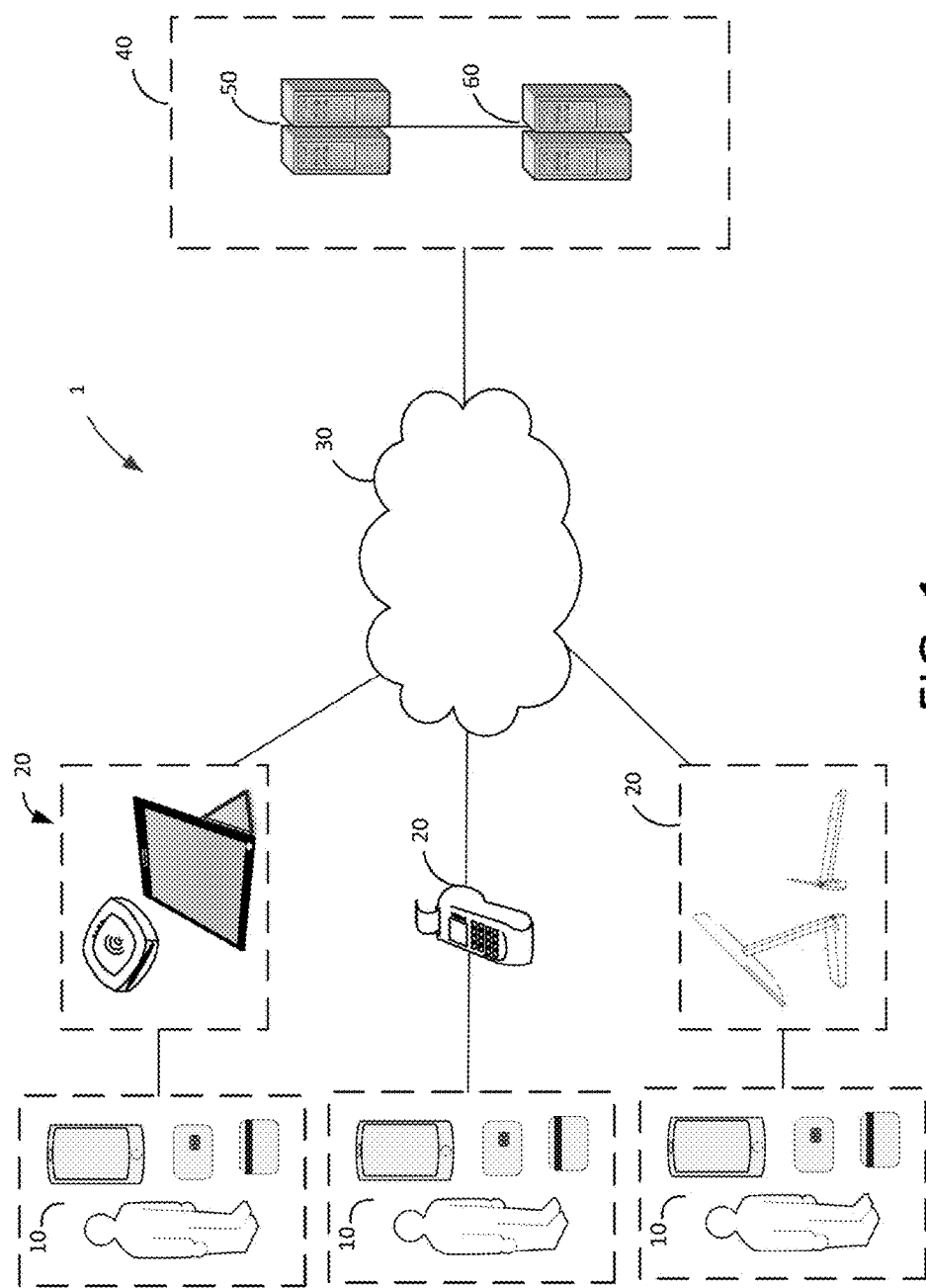
FIG. 1 shows an illustrative block diagram of a payment system in accordance with some embodiments of the present disclosure.

A battery-powered payment processing device such as a payment reader or a payment terminal can have an expedited booting process based on information relating to the status of a power supply (e.g., information relating to previous occurrences of brownout conditions). The payment reader can execute a boot sequence that is stored in ROM (read only memory) in response to a reset signal or the "powering on" of the payment reader. After executing an initial subset of the instructions of the boot sequence at an initial clock rate, a check is performed to determine if the power supply is in a condition that a boosted clock rate may be used to expedite the booting process. In an embodiment, the boosted clock rate may be based on whether the previous execution of the boot sequence was successful. If the last execution of the boot sequence was successful, the remaining instructions of the boot sequence can be executed at the boosted clock rate. Otherwise the remaining instructions of the boot sequence are executed at the initial clock rate which results in a slower boot process with a lower current draw on the power source. In this manner, the slower clock rate may cause it to be more likely that the boot sequence will complete successfully even with a lower power condition of the power supply.

The determination of whether the last execution of the boot sequence was successful may be based on the value of a flag stored in a register. The register storing the flag is part of analog front end circuitry for the payment reader, which analog front end circuitry can be powered by a battery separate from the power supply for the payment reader such that the value stored in the register is persisted whether or not a reset condition has occurred in a prior attempt to execute the boot process. The register may be set by the analog front end circuitry based on a variety of conditions, such as whether a reset signal was provided to a processor, whether a brownout condition occurred, a power condition of the power, and similar indicators.

Regardless of the clock rate used by the processor to execute the boot sequence, a determination can be made as part of the boot sequence as to whether or not a predetermined portion of the boot sequence has been completed or surpassed. In an embodiment, the predetermined portion of the boot sequence can correspond to the completion of the boot sequence. If the predetermined portion of the boot sequence has been completed, the value of the flag in the register can be cleared (or set to a value indicating a successful execution of the boot sequence). In this manner, during subsequent boot attempts the processor can attempt to execute the boot instructions at the boosted clock rate. In some embodiments, the flag may only be cleared under certain subsets of conditions, such as a successful boot at the boosted clock rate, multiple successful boots, measurement of other operating conditions relating to the payment reader or a power source thereof, or a suitable combination thereof.

Once the boot instructions have been executed, the processor may execute operating instructions for the payment reader (e.g., to execute a payment transaction, communicate with other devices, manage the battery and external power sources, and other suitable processing). However, if the predetermined portion of the boot sequence has not been completed, such as when a brownout occurs during the boot sequence, the value of the flag in the register can be set to a value indicating an unsuccessful execution of the boot sequence and the boot sequence can be restarted. Since the flag in the register indicates an unsuccessful execution of the boot sequence, the restarted boot sequence can be executed at the initial clock rate to attempt to ensure completion of the boot sequence with lower power consumption.

In addition, the expedited boot process of the present disclosure avoids the problem of frequent unsuccessful attempts to execute the boot sequence at a high clock rate as a result of a low power level in the battery or power supply of the payment reader. The execution of the boot sequence at a high clock rate can require a large amount of power and may not be able to be completed if the battery or power supply of the payment reader does not have sufficient power available. The process of attempting to execute the boot sequence at the high clock rate can continue for as long as it takes for the battery or power supply to obtain a sufficient power level from charging by an external power supply such that there is sufficient power to complete the boot sequence. In contrast, the expedited boot process can attempt to complete the boot sequence at the boosted clock rate, but if the boot sequence fails because there is not enough power available, the expedited boot process can re-execute the boot sequence from the ROM boot instructions at the initial clock rate in order to be able to successfully boot the payment reader and corresponding processor since the slow clock rate uses less power.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. The components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

In an embodiment, the payment terminal may include a battery and an external power supply. Based on the type of payment terminal, different battery sizes and types may be provided and different external power supplies may be utilized. For example, based on desired applications and form factors different devices may be manufactured to receive power from only an AC power source, while other devices (e.g., smaller devices having form factors suitable for mobile usage) may attempt to limit power consumption under most circumstances and may interact with less powerful power sources such as via a UBS connection. These latter devices may regularly go to sleep, power off, shut off certain circuitry, and perform other similar operations in an attempt to limit power usage. However, if the power available for use by such a device falls below a certain level this may cause some components and circuitry to cease operating correctly. For example, processors or communication circuitry may send and receive corrupted or incorrect signals. In some cases, protective measures for a device may not operate correctly under certain conditions. Accordingly, it may not be desirable for the device to operate when power levels fall below a predetermined level, for example, as measured by brownout circuitry.

Figure 2:
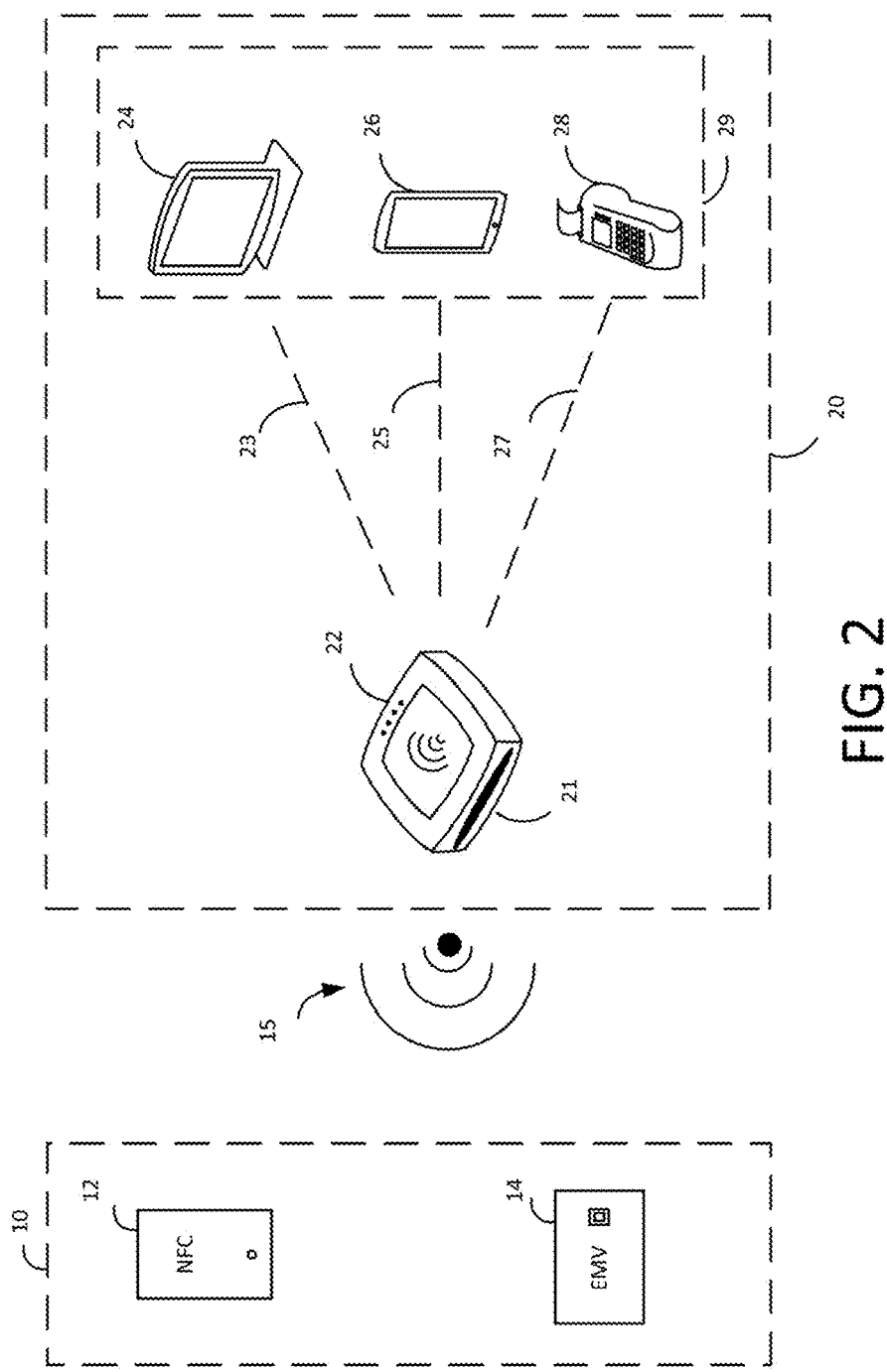
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction, NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 executes a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g., by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
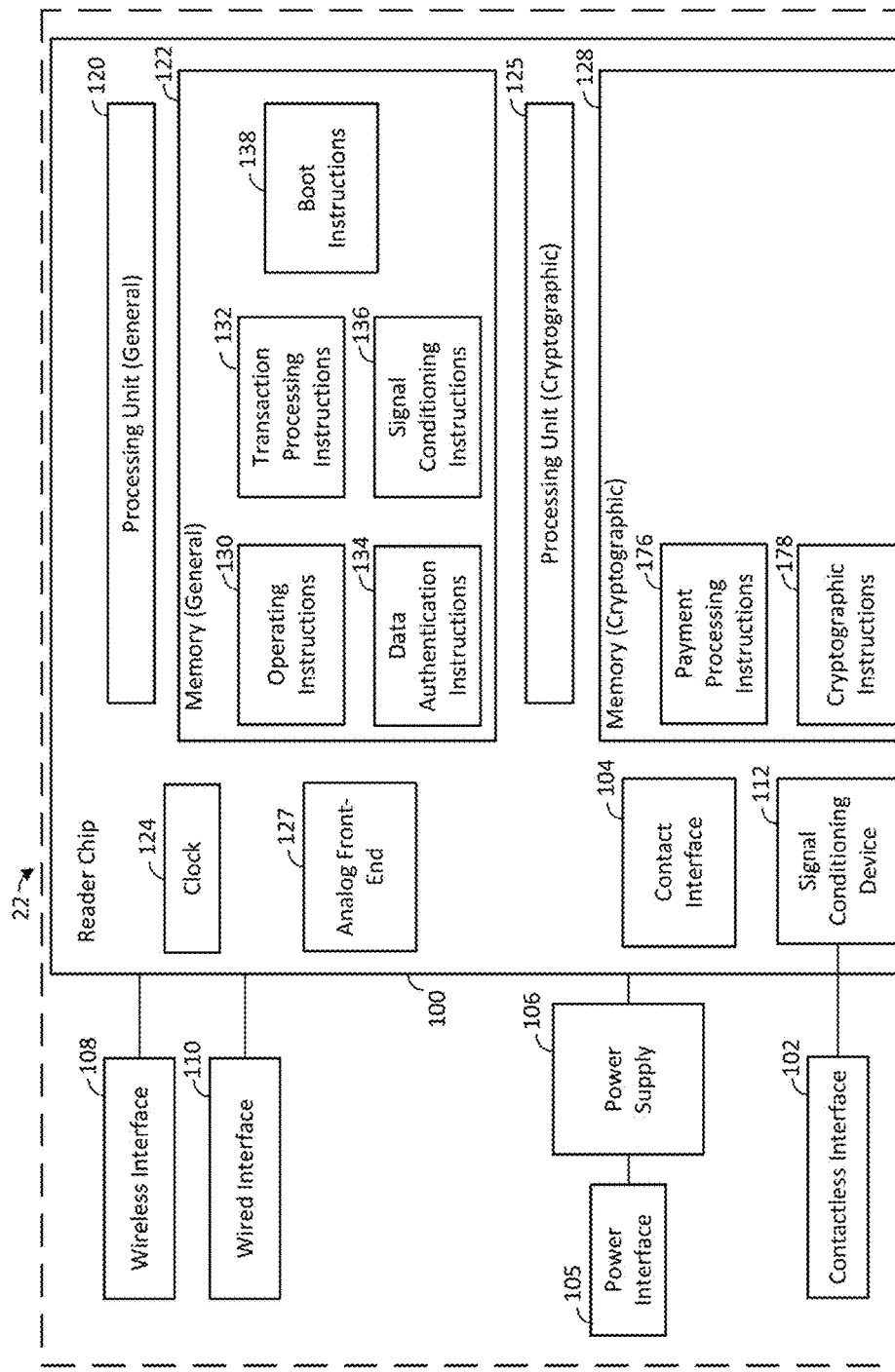
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may communicate with an interactive electronic device such as a merchant device 29 via wireless (e.g., using Bluetooth classic or Bluetooth low energy) or wired (e.g., using USB connectors). Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner.

In one embodiment, payment reader 22 includes a reader chip 100, a plurality of payment interfaces (e.g., a contactless interface 102 and a contact interface 104), a power supply 106, a power interface 105 for the power supply 106, a wireless communication interface 108, a wired communication interface 110, and a signal conditioning device 112. Payment reader 22 (e.g., reader chip 100 of payment reader 22) may also include a general processing unit 120 (e.g., a terminal/reader processing unit), general memory 122, a cryptographic processing unit 125, and cryptographic memory 128. Although in one embodiment the processing units and memories will be described as packaged in a reader chip 100, and configured in a particular manner, it will be understood that general processing unit 120, general memory 122, a cryptographic processing unit 125, and cryptographic memory 128 may be configured in any suitable manner to perform the functionality of the payment reader 22 as is described herein. It will also be understood that the functionality of reader chip 100 may be embodied in a single chip or a plurality of chips, each including any suitable combination of processing units and memory to collectively perform the functionality of reader chip 100 described herein.

In some embodiments, processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions in any suitable number of memories and memory types (e.g., a variety of RAM and ROM memory types). In some embodiments, processing unit 120 may have multiple independent processing units, for example a multi-core processor or other similar component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may execute software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include analog front-end circuitry 127 and additional circuitry such as interface circuitry, security circuitry, and monitoring component circuitry. In one embodiment, the interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, and Lightning), and circuitry for interfacing with other communication interfaces or buses (e.g., I²C, SPI, UART, and GPIO). Reader chip 100 may also include circuitry for implementing a contact interface 104 (e.g., power and communication circuitry for directly interfacing with an EMV chip of a chip card 14 that is inserted into slot 21) and a contactless interface (e.g., an antenna and processing circuitry for providing NFC carrier signals and sending and receiving inductively coupled data signals).

In an exemplary embodiment, reader chip 100 may perform functionality relating to the processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (i.e., general memory 122 and cryptographic memory 128). In this manner, specific cryptographic processing and critical security information (e.g., cryptographic keys, passwords, user information, etc.) may be securely stored by cryptographic memory 128 and processed by cryptographic processing unit 125 (e.g., within a separate secure enclave having unique tamper protection components).

One or both of general processing unit 120 and cryptographic processing unit 125 of reader chip 100 may communicate with the other (e.g., processing unit 120 may communicate with cryptographic processing unit 125 and vice versa), for example, using any suitable internal bus and communication technique. In this manner, reader chip 100 can process transactions and communicate information regarding processed transactions (e.g., with merchant device 29).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader 22 and the chip card 14 are able to exchange information such as payment information. Note that, in some embodiments, contact interface 104 may be housed on reader chip 100 and may communicate with the various components of reader chip 100 via any suitable means (e.g., a common internal bus).

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When the power supply 106 includes a battery, the battery may be charged using the power interface 105 via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components. In one embodiment, the power supply 106 may incorporate a bias generator to generate one or more bias voltages that are provided to components of reader chip 100 such as contact interface 104, processing unit 120, and memory 122. In one embodiment, a suitable bias voltage generated by the bias generator may be 3.3 volts.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a device which may include a processing unit (not depicted) and memory (not depicted).

Wired communication interface 110 may include any suitable interface for wired communication with other devices or a communication network, such as USB, Lightning, FireWire, Ethernet, any other suitable wired communication interface, or a suitable combination thereof. In some embodiments, wired communication interface 110 may allow payment reader 22 to communicate with one or both of merchant device 29 and payment server 40.

In some embodiments, reader chip 100 may include a signal conditioning device 112. The signal conditioning device 112 may include any suitable hardware, software, or a combination thereof. Signal conditioning device 112 may receive and condition signals sent from contactless interface 102, such as when a payment device 10 using NFC communication communicates with payment reader 22. In an embodiment, signal conditioning device 112 may operate based on instructions stored at reader chip 100 (e.g., signal conditioning instructions 136) for use in interacting with the contactless interface 102.

In some embodiments, general memory 122 may be a suitable memory as described herein, and may include a plurality of sets of instructions for controlling operations of payment reader 22 and performing general transaction processing operations of payment reader 22, such as operating instructions 130, transaction processing instructions 132, data authentication instructions 134, signal conditioning instructions 136, and boot instructions 138. In one embodiment, the boot instructions 138 can be stored in a ROM (read only memory) portion or segment of general memory 122. The other instructions (e.g., operating instructions 130, transaction processing instructions 132, data authentication instructions 134, and signal conditioning instructions 136) may be operational instructions (e.g., stored in RAM) that may be updateable (e.g., based on firmware updates).

Operating instructions 130 may include instructions for controlling general operations of the payment reader 22, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing instructions stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and other suitable information related to the processing of payment transactions. In some embodiments, transaction processing instructions 132 may perform high level processing, and provide instructions for processing unit 120 to communicate with cryptographic processing unit 125 to perform most transaction processing operations. In addition, transaction processing instructions 132 may provide instructions for acquiring any suitable information from a chip card (e.g., via contact interface 104 and cryptographic processing unit 125) such as authorization responses, card user name, card expiration, etc.

Data authentication instructions 134 may include instructions for providing configuration information for a payment terminal 20. The configuration information may include suitable information such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK may be tailored for a particular jurisdiction (e.g., country-specific).

Signal conditioning instructions 136 may include instructions for conditioning signals received from a payment device 10 via the contactless interface 102 (e.g., from a NFC payment device 12). Although in some embodiments, signal conditioning instructions 136 may include instructions for manipulating signals received via contactless interface 102, signal conditioning instructions 136 may include instructions for conditioning signals, including signals that are initially processed by signal conditioning hardware, such as signal conditioning device 112.

Boot instructions 138 may include instructions for initiating operation of the reader chip 100. The boot instructions 138 can perform any required self-tests and/or initializations of components of the payment reader 22 or reader chip 100 and then execute a "bootloader" to load the corresponding operating instructions 130 into RAM for execution by the general processing unit 120. Once the boot instructions 138 are loaded and executed successfully, the operating instructions 130 can then be executed by the general processing unit 120 to control the operation of the reader chip 100 and payment reader 22 as previously described.

Cryptographic processing unit 125 may be any suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176 and cryptographic instructions 178. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

The reader chip 100 may also include a clock 124. Clock 124 may include a clock source (not depicted) and a clock management unit (not depicted). The clock source may be any suitable clock source such as a crystal oscillator and may provide a clock signal at a clock frequency to the clock management unit. The clock management unit may generate a plurality of clock signals (to be output by clock 124) based on the input from the clock source, for example, a clock signal for processing unit 120 and a clock signal having a suitable frequency for transmission for near field communications (e.g., 13.56 MHZ). In one embodiment, the clock signal provided by clock 124 can be used to control the speed with which the boot instructions 138 are executed by the general processing unit 120. A higher frequency clock signal can result in a faster speed for executing boot instructions 138 and a lower frequency clock signal can result in a slower speed for executing boot instructions 138.

Figure 4:
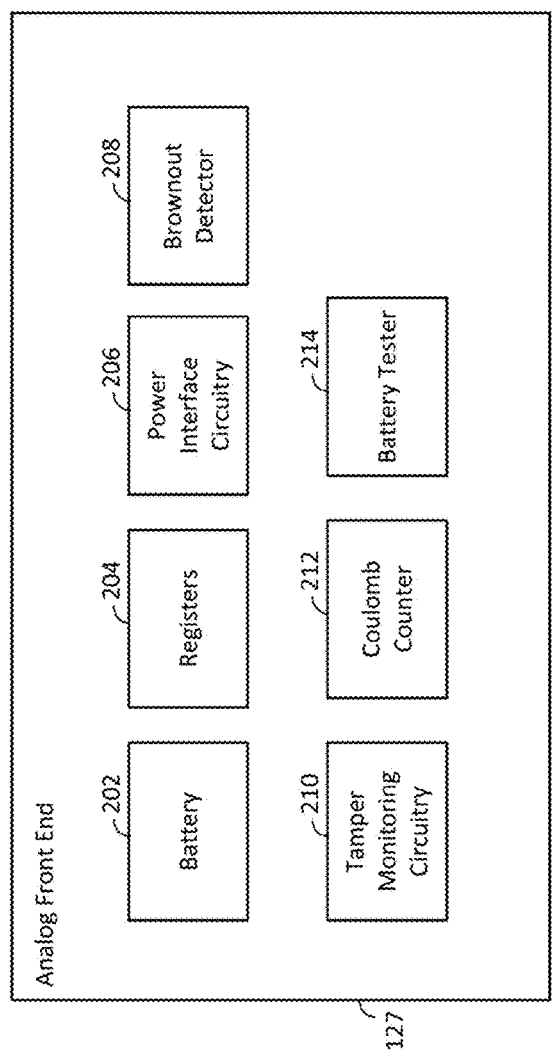
FIG. 4 depicts an illustrative block diagram of certain components of an analog front end for a payment reader in accordance with some embodiments of the present disclosure.

FIG. 4 depicts an illustrative block diagram of certain components of an analog front end 127 for a payment reader 22 in accordance with some embodiments of the present disclosure. In an embodiment, at least some of the components of analog front end 127 depicted in FIG. 4 may operate in parallel to the general processing unit 120 (e.g., based on a unique power source such as a battery) and thus may be operational without regard to whether the execution of the boot instructions 138 by the general processing unit 120 has completed during the current or previous boot cycle. Analog front end may perform operations and store status indicators (e.g., flags in registers 204) that may be accessed by other components of reader chip 100 such as general processing unit 120. In this manner, analog front end 127 may operate in conjunction with general processing unit 120 executing boot instructions 138 in order to expedite the boot process for the reader chip 100.

Although particular components are depicted in the particular arrangement of FIG. 4, it will be understood that the analog front end 127 may include additional components, one or more of the components depicted in FIG. 4 may not be included in the analog front end 127, and the components of the analog front end 127 may be rearranged in a suitable manner. In an embodiment, the analog front end 127 includes at least a battery 202, a registers 204, power interface circuitry 206, a brownout detector 208, and tamper monitoring circuitry 210.

The battery 202 can be used to provide power to one or more components of the analog front end 127 such that the components may operate without regard to the power level provided by power supply 106. Some or all of the components of analog front end 127 may function even during failed boot attempts or other events such as reset and tamper events. Information about such events may be persisted even while other components of the reader chip 100 may not be operational (e.g., are in a reset or low power state). An exemplary battery 202 can be a "coin-cell" type battery in an embodiment, but other types of batteries can be used in other embodiments. In another embodiment, the battery 202 can be placed in payment reader 22 at a location separate from reader chip 100 and analog front end 127.

Registers 204 can be used to store information (e.g., flags) that relate to the operation of the analog front end 127 as well as any other components of the system. In some embodiments, analog front end 127 may be in operational communication with other components of the payment reader 22 system such as processing unit 120, power supply 106, and power interface 105. Based on the operation of any of these components, data may be stored in the registers 204. In addition, register values may be used to modify the operation of components of the analog front end. In this manner, the analog front end 127 may store information that may be accessed or controlled by other components of the payment reader. In some embodiments, information that is related to the boot loading process may be stored in one or more of the registers 204, such as a reset flag, brownout flag, charge flag, power level flag, or tamper flag. An exemplary brownout flag may provide information regarding whether a brownout occurred during a boot process (e.g., whether a voltage level supplied to components of the system fell below a brownout threshold). The presence of the flag in the registers 204 can indicate that a brownout occurred during the boot process or that there was some other problem during the boot process. The absence of the brownout flag (or a different value of the flag) in the registers 204 can indicate that the last execution of the boot process was successful. In addition to storing the flag when needed, the brownout register 204 can also store information relating to the cause of or circumstances surrounding the brownout or other event that triggered the generation of the flag.

The power interface circuitry 206 can include circuitry for interfacing and controlling the power supply 106. In one embodiment, the power interface circuitry 206 can include power management circuitry, power conversion circuitry, rectifiers, and battery charging circuitry. In another embodiment, the power interface circuitry 206 may include the bias generator (instead of power supply 106) to generate one or more bias voltages that are provided to components of reader chip 100. A suitable bias voltage generated by the bias generator may be 3.3 volts in an embodiment.

The brownout detector 208 can include circuitry for determining if the system power level (e.g., based on the supply voltage provided by the bias generator) falls below a threshold voltage. The brownout detector 208 can include a supply voltage monitoring circuit to provide a signal that causes the system to modify its operation in response to a brownout event (e.g., to initiate the boot process when the supply voltage drops below the threshold voltage). In an embodiment, the brownout detector 208 can also set one or more brownout flags of register 204, based on information such as when the brownout occurred (e.g., during boot process) and number of brownout events. In one embodiment, for a supply voltage of 3.3 volts, the threshold voltage can be about 2.9 volts. In another embodiment, the threshold voltage can be programmable to a desired voltage level. In still another embodiment, the brownout detector 208 can be incorporated into the power supply 106 and can send a signal to brownout flag register 204 if a brownout event occurs during the boot process.

The tamper monitoring circuitry 210 can include monitoring components that measure whether a third-party is attempting to tamper with one or more components of the payment reader 22, for example based on tamper domes, tamper meshes, and electrical characteristics of various components of the payment reader 22, such as the payment interfaces that interact with the various types of payment devices. Using these monitoring components, the tamper monitoring circuitry 210 is able to monitor values such as current, voltage, impedance, and capacitance, to determine whether a component is acting in an abnormal manner that is consistent with a tamper attempt. In one embodiment, tamper monitoring circuitry 210 may include circuitry for interfacing with any of the monitoring components, such as signal conditioning circuitry, control circuitry, analog-to-digital conversion circuitry, digital-to-analog conversion circuitry, circuitry for measuring inductance or capacitance, timing measurement circuitry, any other suitable circuitry, or any combination thereof. The tamper monitoring circuitry 210 can provide a reset signal to initiate the boot process when monitored conditions indicate a possible tamper attempt, and may provide information about a tamper event such as a tamper source or severity of the event. In some embodiments, tamper monitoring circuitry 210 of analog front-end circuitry 127 may also include circuitry for interfacing with the analog components of contactless interface 102 (e.g., electromagnetic compatibility (EMC) circuitry, matching circuits, modulation circuitry, and measurement circuitry).

The analog front end circuitry 127 may also include circuitry such as a coulomb counter 212 and/or a battery tester 214 to determine the available power from the power supply 106. The coulomb counter 212 can be used to monitor the current used (i.e., both amount of current and direction of current) and determine the remaining power available in the power supply 106. In one embodiment, the current used by the power supply 106 can include the current provided from the power supply 106 and the current received by the power supply 106, if the power supply 106 is rechargeable. The battery tester 214 can use components (e.g., one or more resistors) to measure a voltage drop based on the current from the power supply 106 and from the measured voltage determine the remaining power available from the power supply 106. The information from the coulomb counter 212 and the battery tester 214 regarding the remaining power available from the power supply 106 can be stored in a persistent register or memory device that is powered by battery 202 in the analog front end circuitry 127. In one embodiment, the persistent register(s) for the coulomb counter 212 and/or the battery tester 214 can be included with the brownout flag register 204.

Figure 5:
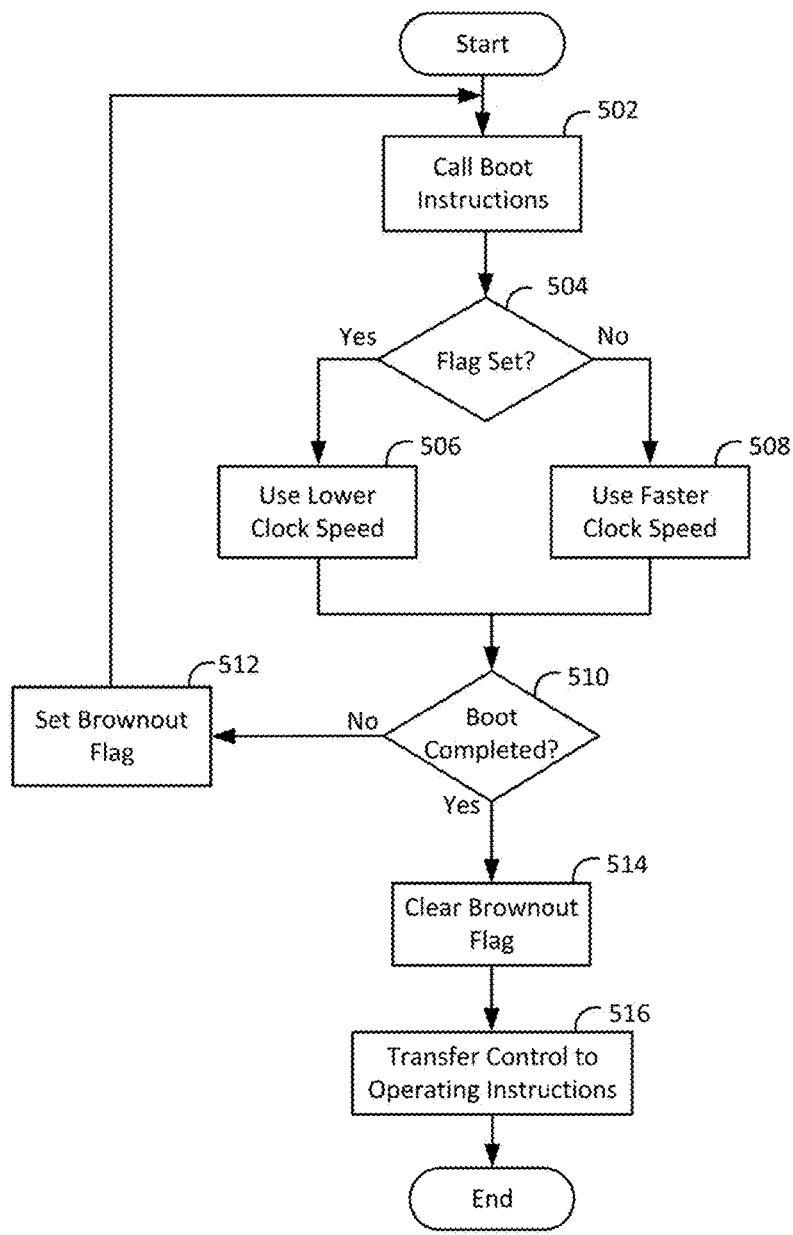
FIG. 5 depicts a non-limiting flow diagram illustrating exemplary steps for a boot sequence for a payment reader in accordance with some embodiments of the present disclosure.

In view of the structures and devices described supra, methods that can be implemented in accordance with the disclosed subject matter will be better appreciated with reference to the flowchart of FIG. 5. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 5 depicts a non-limiting flow diagram illustrating exemplary steps for a boot sequence for a payment reader 22 based on information stored by a flag such as a brownout flag (e.g., of registers 204 of analog front end circuitry 127). In embodiments, the boot sequence can be initiated as part of the boot process when "powering on" the payment reader 22 from an "off" state, when a user causes execution of the reset process for the payment reader 22, or in response to reset triggering condition occurring (e.g., a brownout condition occurring during operation of the payment reader 22). During a reset event, a pre-reset signal can be sent to the processor 120 to allow the processor to change the state of one or more components for the reset before a reset signal is sent cause components to be reset and begin a new boot process. Once a boot process has begun, processing may continue to step 502.

At step 502, the boot sequence may begin by the general processor 120 calling the boot instructions 138 stored in the ROM portion of general memory 122. Exemplary initial instructions or steps of the boot sequence can be performed in order to initialize components of the payment reader 22. In an embodiment, the general processor 120 may have a variety of clock rates that it is capable of operating at, such that when executing at higher clock rates operations such as the boot process may be completed significantly faster than when operating at lower speeds. Although any suitable one of these clock rates may be utilized during initial steps of the boot process (e.g., to ramp-up or ramp-down clock rates based on different information stored at registers 204), in an initial clock rate may be lower clock rate that is associated with minimal power usage. Processing may continue to step 504.

At step 504, one or more registers (e.g., brownout flag of registers 204 in f FIG. 5) may be examined to determine a value of a flag. The presence and values of the one or more flags in the registers 204 may provide an indication of an event that requires or permits a change in clock rate, such as a brownout flag indicating that the last attempt to execute the boot sequence was unsuccessful as a result in a drop in voltage. Once the register values have been checked, processing may continue to step 506 or 508 based on the values. In the embodiment of FIG. 5, if it is determined that there is a brownout flag stored in registers 204 in step 504, the sequence may proceed to step 506. If it is determined that there is not a brownout flag stored in registers 204 in step 504, the sequence may proceed to step 508.

At step 506, a lower clock rate may be used based on the flag indicating that a brownout event has previously occurred, and in some embodiments, based on additional information about the brownout flag or from other flags (e.g., of a coulomb counter or voltage tester). In an embodiment, the initial clock rate may be retained, while in other embodiments, if a lower clock rate is available the clock rate used during boot may be reduced. and executes the remaining steps of the boot sequence at a lower clock rate. In one embodiment, a variety of clock rates may be available such that the highest available clock rates may be at least 1.01, 2, 10, 100, 1000, or greater times more than the lowest available clock rates.

If processing has continued to step 508, a boosted clock rate may be used based on the flag indicating that a brownout event has not occurred recently, and in some embodiments, based on additional information about the brownout flag or from other flags. In an embodiment, the clock rate may be increased to the maximum clock rate, while in other embodiments, the clock rate may be increased between a number of higher available rates information from the flags. Once the boosted clock rate is determined, the general processor 120 may execute the remaining steps of the boot sequence at the boosted clock rate.

Whether the clock rate is maintained, increased, or decreased at one of steps 506 or 508, the general processor may execute the boot instructions in an attempt to complete initialization steps and the boot process at step 501. If the clock rate is too high with respect to the available power supply, values may change or events may occur (e.g., as determined by analog front-end 127) that indicate that the clock rate is too high. As described herein, brownout events may occur, resets may be required, or values of a coulomb counter or voltage tester may indicate that the clock rate is too high. In one embodiment, instead of determining if the boot sequence has been completed, a determination can be made if a threshold portion of the boot sequence has been completed or surpassed (e.g., based on persisting information about a boot state, e.g., at registers 204). In one embodiment, the boot sequence may not be able to complete or surpass a threshold portion of the boot sequence or an event such as a brownout or reset. If the boot process does not complete, processing may continue to step 512, while if the boot process does complete processing may continue to step 514.

If the boot sequence did not complete successfully in step 510, the brownout flag is set in the registers 204 in step 512 (e.g., based on the analog front end determining that a brownout event and/or reset occurred). The sequence may then return to step 502 to restart the boot sequence. In an embodiment, if the boot sequence did not complete successfully when operating at the slower clock rate, a flag may be checked that may cause the boot sequence to implement additional measure to avoid frequent cycling of the boot sequence. For example, the boot sequence may check for a flag to implement a predetermined time delay or require some user action (e.g., attaching a cable to the power interface 105 to charge the power supply 106 or requiring the user to select a button on the payment reader 22) before restarting the boot sequence. In contrast, if the boot sequence has successfully completed in step 510, the brownout flag may be cleared (e.g., by general processor 120 communicating with analog front end circuitry) or removed from the registers 204 in step 514. In another embodiment, the brownout flag can be set to a value indicating successful completion of the boot sequence. After the brownout flag is modified and other steps of the boot sequence are complete, the control of the payment reader 22 is transferred from the boot instructions 138 of the boot sequence to the operating instructions 130 in step 516 for the operating instructions 130 to begin controlling operation of the payment reader 22.

In one embodiment, the higher clock rate in step 508 and the lower clock rate in step 506 can be programmable and stored in persistent registers or memory devices that are powered by battery 202 in the analog front end circuitry 127. In another embodiment, the persistent register(s) for the higher clock rate and the lower clock rate can be included with the registers 204. In still another embodiment, one or more intermediate clock rates between the higher clock rate and the lower clock rate can be stored in registers and used during the boot process to provide intermediate clock rates for executing the boot instructions 138. For example, when intermediate clock rates are provided, the detection of a brownout flag in step 504 does not have to result in the use of the lower clock rate, but instead can result in the use of an intermediate clock rate that is slower the faster clock rate. The process of using the intermediate clock rates, instead of the lower clock rate, can continue for as long as brownout conditions occur and intermediate clock rates are available. Each time a brownout condition occurs during the boot sequence, a slower intermediate clock rate for the subsequent execution of the boot sequence can be selected until all of the intermediate clock rates have been attempted.

In other embodiments, the check for the brownout flag in step 504 can be replaced by other evaluations that can give an indication of the available power for the boot process. For example, the check for the brownout flag in step 504 can be a check of the power supply 106 for sufficient power to complete the boot process. The check of the available power in the power supply 106 can be based on the determination that the remaining power available in the power supply 106, as determined from one or both of the coulomb counter 212 and the battery tester 214, is greater than a threshold power level. If the available power is greater than the threshold power level then the faster clock rate can be used, otherwise the lower clock rate can be used. In another embodiment, if intermediate clock rates are provided, a clock rate can be selected based on the actual amount of remaining power available.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A payment transaction processing device having an expedited boot mode, comprising:
   an external power supply interface;
   an internal battery;
   front end circuitry coupled to the external power supply interface and the internal battery to provide power to one or more components of the payment transaction device, the front end circuitry comprising one or more registers, wherein a brownout register of the one or more registers has a value that indicates whether a brownout previously occurred, and wherein the front end circuitry sets the value in the brownout register to indicate that a brownout occurred when a voltage supplied by the front end circuitry to the one or more components of the payment transaction device is less than a brownout threshold voltage;
   a read-only memory (ROM) comprising boot instructions;
   a read-write memory comprising operating instructions; and
   a processor coupled to the front end circuit, the read-only memory, and the read-write memory to:
   execute the boot instructions to operate the processor at a first clock rate;
   execute the boot instructions to access the value of the brownout register while the processor operates at the first clock rate;
   execute the boot instructions to increase the clock rate of the processor to a second clock rate when the value indicates that the brownout did not previously occur, wherein the second clock rate is greater than the first clock rate;
   execute the boot instructions to determine that execution of the boot instructions by the processor has surpassed a threshold portion of a boot sequence comprising the boot instructions;
   execute the boot instructions to modify the value of the brownout register to indicate that the brownout has not previously occurred when the threshold portion has been surpassed;
   execute the boot instructions to cause the processor to access the operating instructions after execution of the boot instructions is complete; and
   execute the operating instructions, after completion of the execution of the boot instructions, to process a payment transaction.

2. The payment transaction processing device of claim 1, wherein the processor is configured to execute the boot instructions to maintain the clock rate of the processor at the first clock rate when the value of the brownout register indicates that the brownout did previously occur.

3. The payment transaction processing device of claim 1, wherein the processor is configured to execute the boot instructions to modify the value of the brownout register to indicate that the brownout has previously occurred when the threshold portion has not been surpassed.

4. The payment transaction processing device of claim 1, wherein the second clock rate is at least twice as fast as the first clock rate.

5. A payment reader, comprising:
   a first memory device storing boot instructions to execute a boot sequence;
   a second memory device storing operating instructions for the payment reader;
   a third memory device storing a value related to a prior execution of the boot sequence; and
   a processor coupled to the first memory device, the second memory device and the third memory device, the processor configured to receive the boot instructions from the first memory device and to execute the boot instructions to cause the processor to:
   operate at a first clock rate;
   retrieve the value from the third memory device;

operate at a second clock rate greater than the first clock rate in response to the value from the third memory device indicating that the prior execution of the boot sequence was successful;

determine that execution of the boot instructions by the processor has surpassed a threshold portion of the boot sequence;

modify the value in the third memory device to indicate that execution of the boot sequence was successful in response to the determination that the threshold portion of the boot sequence has been surpassed; and access the operating instructions in the second memory device after execution of the boot instructions is complete.

6. The payment reader of claim 5, further comprising:
a power supply; and
front end circuitry coupled to the power supply and the processor, the front end circuitry comprising:
power interface circuitry to provide power from the power supply to one or more components of the payment reader; and
a brownout detector configured to determine when the power from the power supply is less than a threshold power.

7. The payment reader of claim 6, wherein the brownout detector is configured to modify the value in the third memory device to indicate that execution of the boot sequence was not successful in response to determining that the power from the power supply is less than the threshold power.

8. The payment reader of claim 6, wherein the third memory device is part of the front end circuitry.

9. The payment reader of claim 8, wherein the third memory device is a register.

10. The payment reader of claim 8, wherein the front end circuitry comprises a battery to provide power to the third memory device.

11. The payment reader of claim 6, wherein the boot instructions cause the processor to modify the value in the third memory device to indicate that execution of the boot sequence was not successful in response to the determination that the threshold portion of the boot sequence has not been surpassed.

12. The payment reader of claim 11, wherein the determination that the threshold portion of the boot sequence has not been surpassed is based on a determination by the brownout detector that the power from the power supply is less than a threshold power.

13. The payment reader of claim 6, further comprising a power interface coupled to the power supply, the power interface configured to provide power to the power supply from an external power source.

14. The payment reader of claim 5, wherein the boot instructions cause the processor to continue to operate at the first clock rate when the value indicates that the prior execution of the boot sequence was not successful.

15. The payment reader of claim 5, wherein the first memory device is read only memory.

16. The payment reader of claim 5, wherein the processor is configured to receive the boot instructions from the first memory device in response to receiving a reset signal.

17. A method of executing boot instructions in a boot sequence for a payment reader, the method comprising:
operating a processor at a first clock rate to execute a portion of the boot instructions;
retrieving a value from a register, wherein the value of the register is related to a prior execution of the boot sequence;
evaluating the value from the register to determine whether the prior execution of the boot sequence was successful;
operating the processor at a second clock rate greater than the first clock rate to execute the boot instructions in response to the determination that the prior execution of the boot sequence was successful;
determining whether execution of the boot instructions has surpassed a threshold portion of the boot sequence;
modifying the value in the register to indicate that execution of the boot sequence is successful in response to a determination that the threshold portion of the boot sequence has been surpassed; and
accessing operating instructions for the payment reader after execution of the boot instructions is complete.

18. The method of claim 17, further comprising providing power to the register with a battery such that the value stored in the register is maintained during a reset of the payment reader.

19. The method of claim 17, further comprising modifying the value in the register to indicate that execution of the boot sequence is not successful in response to a determination that the threshold portion of the boot sequence has not been surpassed.

20. The method of claim 19, wherein the determination that the threshold portion of the boot sequence has not been surpassed is based on a determination of a brownout condition by a brownout detector.

21. The method of claim 19, further comprising repeating the steps of operating the processor at a first clock rate, retrieving the value from a register, and evaluating the value from the register in response to the determination that the threshold portion of the boot sequence has not been surpassed.

22. The method of claim 21, further comprising continuing to operate the processor at the first clock rate to execute the boot instructions in response to the determination that the prior execution of the boot sequence was not successful.

23. The method of claim 17, further comprising continuing to operate the processor at the first clock rate to execute the boot instructions in response to the determination that the prior execution of the boot sequence was not successful.

24. The method of claim 17, further comprising executing the operating instructions to process a payment transaction.

25. The method of claim 17, further comprising receiving a reset signal prior to operating the processor at the first clock rate.

* * * * *